July 12, 1955    J. LYMAN ET AL    2,713,121
RADIO SCANNING APPARATUS
Original Filed Aug. 12, 1941    2 Sheets-Sheet 1
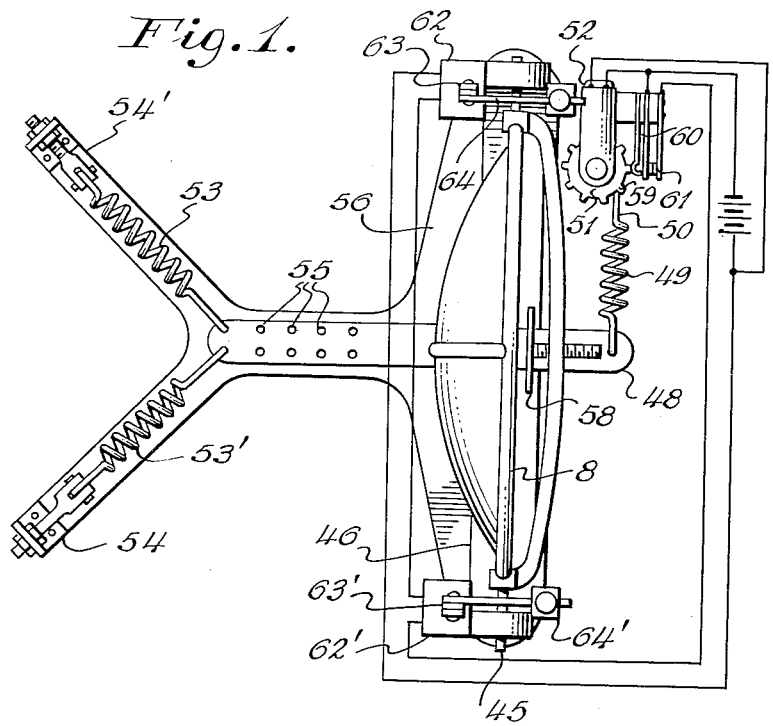
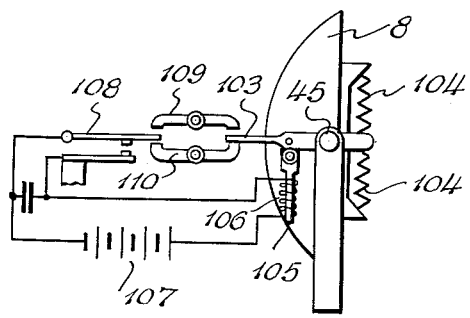
INVENTORS
JOSEPH LYMAN
JOE J. CALDWELL, JR.
BY
Paul B. Hunter
ATTORNEY

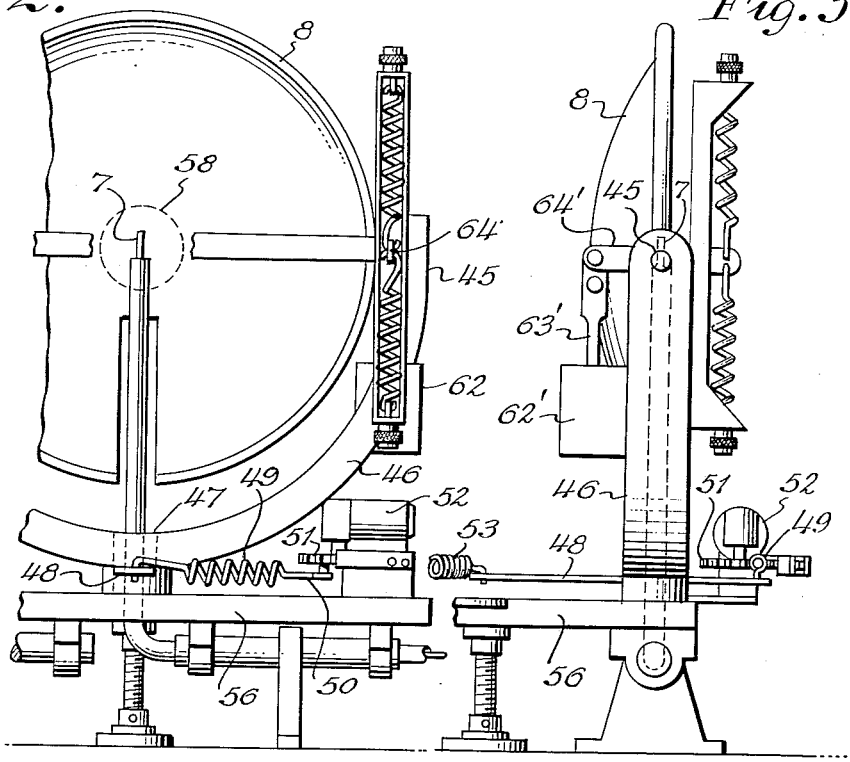

United States Patent Office 2,713,121
Patented July 12, 1955

2,713,121

RADIO SCANNING APPARATUS

Joseph Lyman, Huntington, N. Y., and Joe J. Caldwell, Jr., Bloomfield, N. J., assignors to The Sperry Corporation, a corporation of Delaware Original application August 12, 1941, Serial No. 406,494. Divided and this application October 16, 1947, Serial No. 780,160

13 Claims. (Cl. 250—33.65)

The present invention relates, generally, to the use of ultra high frequency electromagnetic radiation for detecting and locating objects such as targets or obstacles on the water, in air, etc., and the invention has reference, more particularly, to a novel scanning apparatus for use in accomplishing this purpose.

The present invention is a division of our copending application, Serial No. 406,494 filed August 12, 1941, for Radio Apparatus for Detecting and Locating Objects by Joseph Lyman, Joe J. Caldwell, Abbott S. Maeder, Robert O. Haxby, Wilmer L. Barrow and Gereld L. Tawney.

An object of the present invention is to provide novel scanning means for scanning a desired scanning angle or field of view employing mechanical motion of a portion of the scan antenna, such portion being the reflector, for example, or the same may be the electromagnetic radiation emitter.

Another object of the present invention is to provide means wherein rapid scanning is obtained with little or no undesired inertia effects of the movable portion of the scanning system resulting from such rapid scanning.

Another object of the present invention is to provide mechanical resonance means for effecting movement of the movable part of the scanning apparatus.

Still another object of the present invention is to provide a novel scanning means employing an oscillatable reflector and a connected spring arrangement, the reflector being oscillated through desired scanning angles at the resonant frequency or frequencies of the oscillating system, thereby obtaining optimum ease and smoothness of operation.

Another object of the present invention is to provide a novel scanning system employing antenna means in conjunction with a reflector, said antenna means having a scanning movement through the use of a connected spring arrangement and driving means, whereby said antenna oscillates at the natural frequency of the moving system.

Other objects and advantages will become apparent from the specification, taken in connection with the accompanying drawings wherein the invention is embodied in concrete form.

In the drawings,

Fig. 1 is a plan view of a scanning antenna-reflector according to the present invention.

Fig. 2 is a fragmentary front elevational view of the structure of Fig. 1.

Fig. 3 is a view in side elevation of the structure of Fig. 2.

Fig. 4 is a front elevational view of a modified form of scanning means employing a moving antenna.

Fig. 5 is a fragmentary detail of a somewhat modified construction.

Fig. 6 illustrates a structure like that of Fig. 1 but with a modified type of vertical oscillating means.

Referring to Figs. 1, 2 and 3, the illustrated device includes a reflector 8 and apparatus for oscillating the same. This reflector is provided with transverse aligned trunnions 45, the axes of which trunnions pass through the focus of parabolic reflector 8, at which focus is located an antenna 7. The trunnions 45 are shown pivotally carried by a yoke 46 that in turn is pivoted at pivot 47 for vertical turning movement about the vertical axis of antenna 7. This yoke has a transverse bar 48 secured thereto, which bar is used to oscillate the yoke and hence the reflector 8. The portion of bar 48 projecting in front of the reflector 8 is connected through a tension spring 49 and cable 50 to a crank disc 51 driven through reduction gearing from a motor 52. In practice it has been found that the speed of motor 52 may be made such that the reflector 8 is oscillated from 60 to 200 cycles per minute depending upon the desired scanning speed. The portion of bar 48 extending to the rear of reflector 8 is shown connected to substantially opposed tension springs 53, 53' that are connected through adjustable anchors 54, 54' to the base of the apparatus. The rear portion of the bar 48 is shown having a series of holes 55 for enabling adjustment of the connection of springs 53, 53' to this bar. The tension of springs 49, 53 and 53' and the adjustment of these springs through use of anchors 54, 54' and holes 55 is made such that the oscillating system including the two springs, connected bar 48, yoke 46 and reflector 8, is resonant at the desired frequency of oscillation. This condition of resonance eliminates the use of positive stopping means at the ends of the oscillating movements of reflector 8, and not only conserves energy by greatly reducing vibration and jarring of the supporting base 56 but also produces optimum scanning conditions. A disc-shaped reflector 58 is adjustably positioned in front of antenna 7 to prevent dispersion of the radiated energy.

If desired, the reflector 8 may also be oscillated about its transverse axis passing through trunnions 45 as where it is wished to enlarge the scanning area or where it is desired to provide an indication of the elevational angle of the object or objects scanned. This elevational scanning of the reflector would ordinarily take place at a much higher rate than the transverse scanning in order to effect multiple line scanning of the viewed area. This vertical scanning may be at a speed that has a fixed ratio with the rate of azimuthal scanning or it may be at a rate independent thereof. In Figs. 1 to 3 the vertical scanning rate is definitely tied in with the horizontal scanning rate by the apparatus about to be described. This apparatus comprises cam tooth projections 59 equally spaced about the periphery of crank disc 51 which projections intermittently engage a switch actuating lever 60 that serves to intermittently close contacts 61 connected to energize solenoids 62 and 62'. These solenoids in turn actuate plungers 63 and 63' connected through levers 64 and 64' for oscillating the reflector 8 about the horizontal axis, thereby effecting vertical scanning of the field of view. Inasmuch as the solenoids 62 and 62' are energized each time one of the tooth projections 59 passes under switch actuating lever 60 it will be noted that the rate of vertical scanning of the reflector bears a definite ratio to the rate of horizontal scanning. If desired, the vertical scanning may be accomplished through use of a motor similar to motor 52 and operating independently of motor 52 in which case there need not necessarily be a fixed ratio maintained between the horizontal and vertical scanning speeds.

In Fig. 4 transverse azimuthal scanning is obtained by oscillating the antenna 7' rather than the reflector 8'. This is accomplished through use of a driving motor 95 acting through a crank disc 96, cable 97 and tension spring 98 connected to a collar 99 fixed on the concentric line 100 carrying the antenna 7'. Centralizing springs 101 of the spiral type are shown tending to centralize the antenna 7' with respect to reflector 8'. These springs are of such tension that antenna 7' oscillates at the natural frequency of the system and hence has a simple harmonic motion obtaining the advantages present in connection with the structure of Figs. 1 to 3. In the event that elevational scanning of reflector 8' is desired the same equipment may be used as is disclosed in connection with Figs. 1 to 3, similar parts being similarly numbered. A slight modification is shown in Fig. 5 wherein the springs 101 are eliminated and the concentric line 100 is directly driven by a link 102 connected with the crank disc 96. In this connection concentric line 100 may or may not be oscillated at its natural frequency.

In Fig. 6, a somewhat different type of vertical oscillating means is provided for the reflector 8. According to this figure one of the trunnions 45 has a transverse crank arm 103 fixed thereon. Opposed tension springs 104 and 104' connected with one end of the crank arm 103 tend to retain the reflector 8 in its vertical position shown in Fig. 6. The rear portion of crank arm 103 has an armature 105 pivoted thereon which is adapted to be actuated by a solenoid 106 energized in turn from a source 107 through contacts 108 actuated by snap switches 109 and 110. Thus, if reflector 8 is given an initial oscillatory movement as by manual manipulation, first snap switch 109 will be actuated by crank arm 103 to close contacts 108 thereby energizing solenoid 106 and effecting a downward pull upon plunger 105 to maintain the upward movement of reflector 8. After bar 103 moves downward a certain amount it will strike switch 110 which will act to open contacts 108 permitting centralizing springs 104 and 104' to turn reflector 8 downwardly so that this reflector moves at its natural resonant frequency determined by its mass and the constants of springs 104 and 104'.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In apparatus of the character described, scanning antenna means comprising an antenna reflector, means for pivotally mounting said reflector for universal movement substantially about the focus thereof, resilient means connected for directing said reflector in an initial direction, and motive means connected to said reflector for oscillating the same to scan a field of view whose center lies in said initial direction.

2. In apparatus of the character described, scanning antenna means comprising an antenna reflector, means for pivotally mounting said reflector for movement about axes at right angles to each other and extending in a common plane, spring means connected with said reflector and acting about said axes for initially directing the output of said antenna means at right angles to the plane of said axes, motive means for oscillating said reflector about one of said axes, and additional motive means controlled from said first-named motive means for oscillating said reflector simultaneously about the other of said axes.

3. In a position indicating system, a reflector pivoted for turning movement about an axis thereof, spring means connected with said reflector tending to aim the same in a given direction, motive means connected for oscillating said reflector about its pivotal support, and make and break contact means actuated by movement of said reflector for operating said motive means at the natural resonant frequency of said reflector and connected spring means.

4. A scanning means of the character described comprising a reflector having a focal point, an electromagnetic feed antenna element positioned in front of said reflector, means resiliently biasing said element to a position substantially at the focal point of said reflector, and means for moving said antenna feed element about said focal point at the natural frequency of mechanical resonance between said biasing means and said antenna feed element to effect scanning of the electromagnetic energy passing through said antenna feed element.

5. In apparatus of the character described, means for producing a substantially parallel beam of radiated electromagnetic energy comprising focussing means and an antenna element movable with respect to said focussing means, means resiliently biasing said antenna element to a central position substantially at the focus of said focussing means, and means for oscillating said antenna element about said central position at the natural frequency of mechanical resonance between said biasing means and said antenna element.

6. A scanning device comprising a reflector for focusing radio waves, means for tilting said reflector about an axis to scan in one direction, an energy translating device for said radio waves, and means for moving said energy translating device substantially parallel with the axis of tilt of said reflector.

7. A scanning device comprising reflecting means for focusing radio waves, motive means for effecting oscillatory motion of said reflecting means about an axis to scan in a desired direction, an energy translating device for receiving radio energy as focused by said reflecting means, and a means for moving said energy translating device substantially parallel with the axis of oscillation of said reflecting means.

8. A scanning device comprising a mirror for focusing radio waves, means for tilting said mirror about an axis to scan in one direction, a pick-up device for receiving said radio waves, and means for moving said pick-up device substantially parallel with the axis of tilt of said mirror.

9. In a position indicating system, a reflector pivoted for turning movement about an axis thereof, spring means connected with said reflector tending to aim the same in a given direction, motive means connected for oscillating said reflector about its pivotal support, and means for operating said motive means at the natural resonant frequency of said reflector and connected spring means.

10. In an ultra high frequency radio object detecting and locating system wherein a field of view is scanned by a directional radiator supported for pivotal movement about at least one axis, the combination comprising elastic means connected with said radiator for resiliently centralizing the same about an axis, and motive means connected for oscillating said radiator about its pivotal support at the resonant frequency of the radiator and connected elastic means.

11. Apparatus as defined in claim 10, having means for oscillating said reflector about a second axis at right angles to said first axis at a speed different from that of the oscillation about the first axis.

12. In an ultra high frequency radio object detecting and locating system wherein a beam of electromagnetic energy emitted from a dirigible radiator is employed for scanning purposes, the combination of means for effecting scanning movements of said radiator comprising elastic means for biasing the radiator to direct the beam in a given direction, and motive means connected for oscillating the radiator against the elasticity of said elastic means, the speed of said motive means being such as to cause the radiator and connected elastic means to oscillate at a resonant frequency, thereby performing the scanning operation with a substantially simple harmonic motion.

13. In an ultra high frequency radio object detecting and locating system wherein a radio beam emitted from a dirigible radiator is employed to scan a field of view, the provision of means for supporting said radiator about an axis of rotation, and means for oscillating said radiator at the natural period of oscillation of said radiator and said supporting means about the axis of rotation.

References Cited in the file of this patent

UNITED STATES PATENTS

| | | |
|---|---|---|
| 1,109,969 | Cook et al. | Sept. 8, 1914 |
| 1,548,958 | Sperry | Aug. 11, 1925 |
| 1,918,358 | Walton | July 18, 1933 |
| 1,934,078 | Ludenia | Nov. 7, 1933 |
| 2,151,549 | Becker | Mar. 21, 1939 |
| 2,410,666 | Leck | Nov. 5, 1946 |
| 2,419,024 | Iams | Apr. 15, 1947 |